United States Patent [19]

Wachi

[11] Patent Number: 4,972,398
[45] Date of Patent: Nov. 20, 1990

[54] OPTICAL DISK DRIVE WITH SERVO LOOP FOR DETECTING DEFECTIVE DISKS

[75] Inventor: Shigeaki Wachi, Tokyo, Japan

[73] Assignee: Sony Corporation, Tokyo, Japan

[21] Appl. No.: 173,601

[22] Filed: Mar. 25, 1988

[30] Foreign Application Priority Data

Mar. 27, 1987 [JP] Japan .................................. 62-71386

[51] Int. Cl.$^5$ .............................................. G11B 7/095
[52] U.S. Cl. ............................ 369/44.25; 369/44.32;
369/58; 369/111
[58] Field of Search ..................... 369/44–46,
369/54, 58, 111, 124, 49.25, 44.27, 44.32;
358/342

[56] References Cited

U.S. PATENT DOCUMENTS

| | | | |
|---|---|---|---|
| 4,286,318 | 8/1981 | Immink et al. | 369/45 X |
| 4,310,912 | 1/1982 | Kikuchi et al. | 369/45 X |
| 4,334,276 | 6/1982 | Turnbull | 369/58 X |
| 4,445,144 | 4/1984 | Giddings | 369/44 X |
| 4,476,555 | 10/1984 | Joichi et al. | 369/44 |
| 4,527,263 | 7/1985 | Nakagawa | 369/58 X |
| 4,587,644 | 5/1986 | Fujiie . | |
| 4,710,908 | 12/1987 | Ohshima et al. | 369/58 X |
| 4,745,588 | 5/1988 | Yoshikawa et al. | 369/44 X |
| 4,755,977 | 7/1988 | Abed | 369/32 |
| 4,764,914 | 8/1988 | Estes et al. | 369/58 |
| 4,807,211 | 2/1989 | Getreuer | 369/44 |

FOREIGN PATENT DOCUMENTS

2536196 5/1984 France .
60-55523 3/1985 Japan .
60-261044 12/1985 Japan .

*Primary Examiner*—Alan Faber
*Assistant Examiner*—W. R. Young
*Attorney, Agent, or Firm*—Ronald P. Kananen

[57] ABSTRACT

An optical disk recording and reproducing apparatus is provided with an element in a servo system circuit, which element is provided high response characteristics to run out frequency. Output of the element is monitored for detecting whether a disk is defective.

12 Claims, 4 Drawing Sheets

OPTICAL DISK DRIVE WITH SERVO LOOP FOR DETECTING DEFECTIVE DISKS

BACKGROUND OF THE INVENTION

1. Field of the Invention

The present invention relates generally to an optical disk recording and reproducing apparatus for recording and reproducing information on an optical disk. More specifically, the invention relates to an optical disk recording and reproducing apparatus which is capable of detecting a defective disk.

2. Description of the Background Art

As is well known, an optical disk recording and reproducing apparatus scans a laser beam on an optical disk for recording and reproducing information thereon. The optical disk is formed with concentric or helical tracks for recording information thereon. The recording and reproducing apparatus includes a tracking servo mechanism for accurately irradiating the laser beam onto the track and a focus servo system for adjusting the focus of the laser beam.

Such servo mechanisms have limited servo characteristics. Because of the limit in the servo mechanism, a tracking servo mechanism cannot work effectively when circularity of the optical disk is poor to cause error in recording and reproducing information. On the other hand, when the optical disk having poor flatness is used, the focus servo mechanism will not work effectively to frequently cause data error.

Conventionally, in order to distinguish good disks and bad disks among manufactured disks, a standard is set by a radial run out which is a deviation of the circularity of the recording track from an accurate circle and an axial run out which is deviation of the disk surface from accurate flatness.

However, in practical operation, if trouble happens on the servo system, it was not possible to judge whether error is caused on the hardware or the disk. Conventionally, a standard disk is set in place of the used disk for checking the hardware. By checking the hardware, trouble-shooting can occur. However, this process requires a relatively long period to be wasted. Furthermore, in case that the disk is used as a back-up for storing back-up data of a computer and so forth, reliability is degraded. In addition, the aforementioned way of trouble-shooting may cause delay of data processing.

SUMMARY OF THE INVENTION

Therefore, it is an object of the present invention to provide an optical disk recording and reproducing apparatus which can solve the problem in the prior art.

Another object of the invention is to provide an optical disk recording and reproducing apparatus which can detect a defective disk.

In order to accomplish the aforementioned and other objects, an optical disk recording and reproducing apparatus, according to the invention, is provided with an element in a servo system circuit, which element is provided with high response characteristics to a run out frequency. The output of the element is monitored for early detection of a defective disk.

According to one aspect of the invention, an optical disk drive system for at least reproducing information recorded on an optical disk, comprises an optical head designed for at least reproducing information on the optical disk, the information including an error indicative signal, a servo system associated with the optical head for driving the latter at a controlled magnitude, a servo loop associated with the servo system for deriving a servo signal indicative of the magnitude of control of the servo system on the basis of the error indicative signal value, first means for extracting a run out frequency component in the servo loop to output a first signal indicative of the run out frequency component, second means for establishing a model representative of a control magnitude corresponding to a run out component on the basis of the first signal value for producing a second signal indicative thereof, and third means for discriminating run out magnitude of the optical disk on the basis of the second signal value.

The servo system is a tracking servo system, the error indicative signal represents a tracking error, and the first means extracts a radial component frequency. In the alternative, the servo system is a focus servo system, the error indicative signal represents a focus error, and the first means extracts a axial component frequency. The third means compares an absolute value of the second sensor signal value with a reference value which represents a standard run out for detecting a defective disk having a run out magnitude out of a predetermined standard range represented by the reference value. The third means differentiates the second signal value to derive a variation magnitude indicative signal and compares the variation magnitude indicative signal value with a reference value which represents a standard run out for detecting a defective disk having a run out magnitude out of a predetermined standard range represented by the reference value.

In the preferred construction, third means comprises means for comparing an absolute value of the second sensor signal value with a first reference value which represents a first standard run out for detecting a defective disk having a run out magnitude out of a first predetermined standard range represented by the first reference value to produce a first comparator signal when the run out magnitude out of the first standard range is detected, means for differentiating the second signal value to derive a variation magnitude indicative signal, means for comparing the variation magnitude indicative signal value with a second reference value which represents a second standard run out for detecting a defective disk having a run out magnitude out of a second predetermined standard range represented by the second reference value to produce a second comparator signal when the run out magnitude out of the second standard range is detected, and means responsive to at least one of the first and second comparator signals to produce a defective disk indicative signal.

Preferably, the first means comprises a filter circuit including a plurality of bandpass filters each having a passband substantially corresponding to a run out frequency range. Alternatively, the first means may comprise a comb filter circuit having a peak point set at a frequency range corresponding to the run out frequency.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
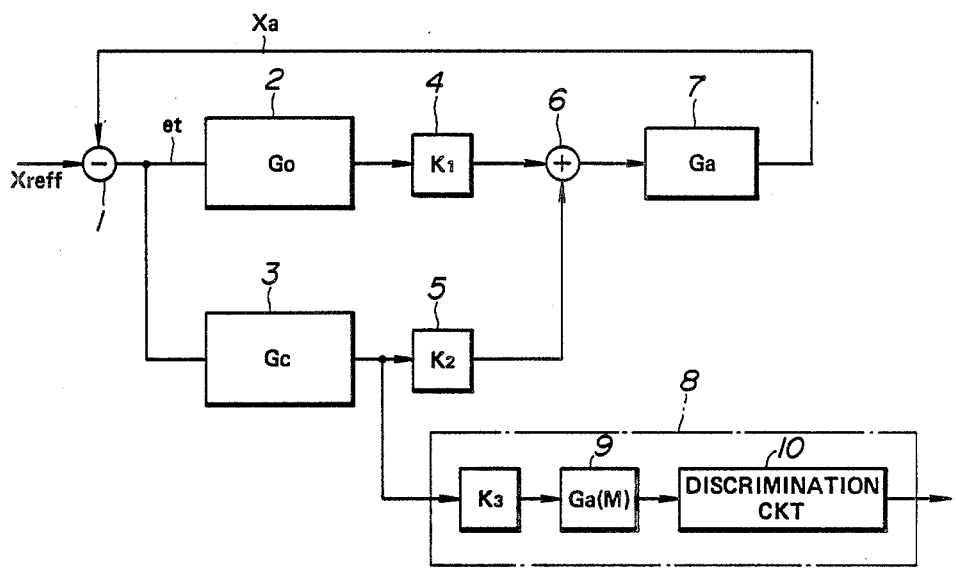
FIG. 1 is a block diagram showing the preferred embodiment of a tracking servo circuit including a circuit for detecting a defective disk, to be employed in an optical disk recording and reproducing apparatus, according to the invention.

Referring now to the drawings, particularly to FIG. 1, the preferred embodiment of an optical disk recording and reproducing apparatus with a defective disk detecting feature includes a tracking servo circuit. The tracking servo circuit includes a subtractor circuit 1 which receives a target value indicative signal $X_{reff}$ representative of a target value, toward which an optical head of the optical disk recording and reproducing apparatus is to be controlled, and a control magnitude indicative signal $X_a$ produced by a tracking servo actuator 7. The subtractor circuit 1 produces a tracking error signal $e_t$ on the basis of the difference of the values of the target value indicative signal $X_{reff}$ and the control magnitude indicative signal $X_a$. The tracking error signal $e_t$ generated by the subtractor circuit 1 is fed to first and second transfer elements 2 and 3. The first transfer element 2 may comprise a known phase compensation circuit and thus is designed to have a characteristics compensating signal transfer characteristics of the actuator 7. On the other hand, the second transfer element 3 may comprise a filter circuit and is designed to have substantially high response characteristics with high gain to an input signal component representative of eccentricity of an optical disk.

Figure 2:
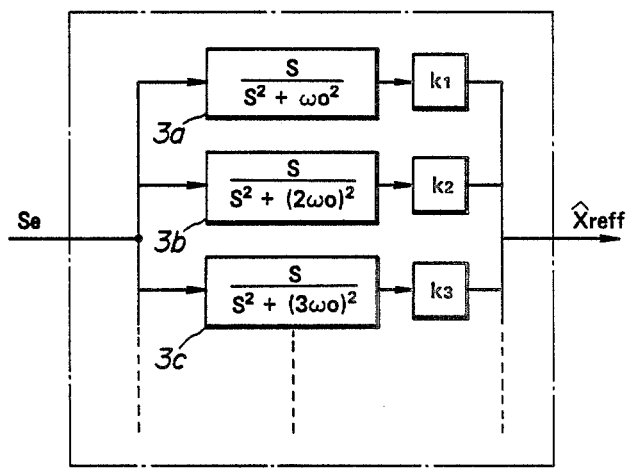
FIG. 2 is a block diagram of a transfer element employed in the preferred embodiment of the tracking servo circuit of FIG. 1.

FIG. 2 shows one example of the second transfer element 3. As will be seen from FIG. 2, the second transfer element 3 comprises a plurality of band-pass filters $3a, 3b, 3c \ldots 3n$ and coefficient circuits $k_1, k_2, k_3 \ldots k_n$ which respectively comprise amplifiers. Each band-pass filter $3a, 3b, 3c \ldots 3n$ is provided with a passband corresponding to a rotational frequency $\omega_0$ of the optical disk and a high frequency component thereof.

The first and second transfer elements 2 and 3 are respectively connected to coefficient circuits 4 and 5. The coefficient circuits 4 and 5 may comprise amplifiers and thus are designed to amplify the input signals from the associated one of the first and second transfer elements 2 and 3 with respectively preset coefficients $K_1$ and $K_2$. The outputs of the coefficient circuits 4 and 5 are added at an adder circuit 6. The adder circuit 6 outputs a driver signal to the tracking actuator 7 to drive the latter.

Figure 3:
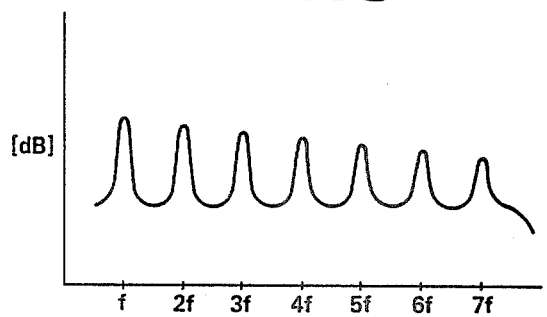
FIG. 3 is a chart showing transfer characteristics in the servo system.

As will be seen from FIG. 1, the subtractor 1, the first and second transfer elements 2 and 3, the coefficient circuits 4 and 5, the adder 6 and the tracking servo actuator 7 form a tracking servo loop so as to derive the control value $X_a$ for controlling magnitude a of operation of the actuator toward the target value $X_{reff}$. In such servo loop, a stable servo system with a reduced steady-state deviation can be obtained by providing a high loop gain for high transfer characteristics relative to an eccentric component $f, 2f, 3f \ldots nf$ of the tracking error signal, which eccentric component constitutes the major part of the tracking error signal, as shown in FIG. 3.

The shown embodiment is further provided with a defective disk detecting circuit 8. The defective disk detecting circuit 8 includes a coefficient circuit $K_3$ comprising an amplifier having a gain corresponding to a predetermined coefficient $K_3$, an actuator model indicative signal generating circuit 9 and a discriminator circuit 10. The shown defective disk detecting circuit 8 is designed for discriminating a good disk and a defective disk by detecting run out magnitude.

Figure 7A:
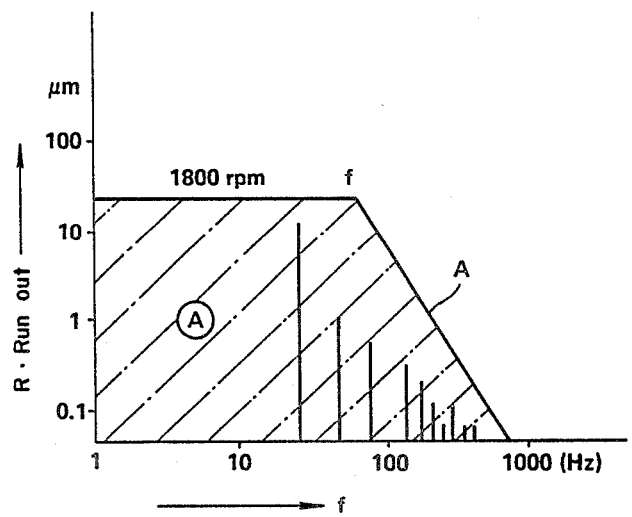
FIGS. 7(a) and 7(b) show frequency characteristics of run out standard.

Here, since the eccentric component constitutes the major part of the tracking error signal, the target value $X_{reff}$ in the tracking servo system substantially corresponds to the magnitude of radial run out of the disk. As set forth, the second transfer element constituted by a plurality of band-pass filters is a selected pass-band substantially corresponding to the frequency range corresponding to a rotational frequency of the optical disk. Therefore, the output of the second transfer element 3 may include only a signal component corresponding to a run out frequency of the loaded disk. Therefore, by checking the output of the second transfer element 3 with reference to a run out standard as defined by region A in FIG. 7(a), a good or defective loaded disk can be discriminated. Therefore, in the shown embodiment, the defective disk detecting circuit 8 is connected to the output of the second transfer element 3 to receive the output signal of the latter.

Figure 4A:
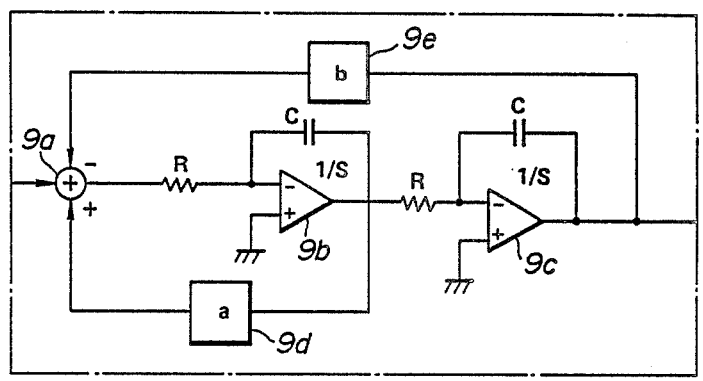
FIG. 4(a) is a block diagram showing transfer model of an actuator in a tracking servo system.
Figure 4B:
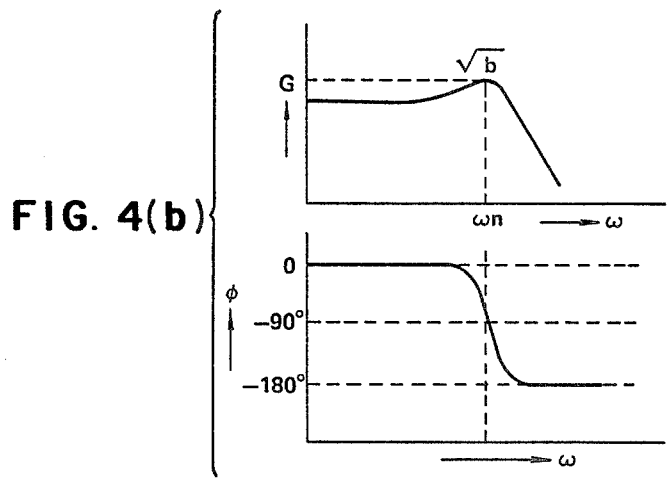
FIG. 4(b) is a chart showing transfer characteristics of the actuator.

When the tracking servo is ON, the target valve $X_{reff}$ corresponds to the control magnitude $X_a$ of the tracking servo actuator 7 as the operation of the tracking actuator is feedback controlled by the tracking servo loop. This means that the control magnitude $X_a$ of the mechanical actuator 7 can be represented by an electric model. As set forth, the control magnitude of the mechanical actuator 7 corresponds to the target value, and the electric model to be derived from the output of the second transfer element 3 may correspond to the electric model of the mechanical actuator. Therefore, the actuator model indicative signal generator circuit 9 in the defective disk detecting circuit 8 arithmetically converts the mechanical control magnitude $X_a$ of the actuator 7 into an electric signal value. Namely, when the transfer characteristics of the actuator can be illustrated by a secondary transfer function $G_a$ $(=1/(S^2+as+b))$, the electric signal having a value corresponding to the control magnitude $X_a$ can be derived by the actuator model indicative signal generating circuit 9. One example of a practical circuit construction of the actuator model indicative signal generator circuit 9 is shown in FIG. 4(a). In the circuit construction of FIG. 4(a), an adder 9a is connected to the coefficient circuit ($K_3$) to receive the output of the second transfer element 3 as amplified with the coefficient $K_3$ therethrough. The adder 9a is connected to an integrator circuit 9b which comprises an operational amplifier, a capacitor C and a resistor R. The output terminal of the integrator circuit 9b is connected to another integrator circuit 9c which also comprises an operational amplifier, a capacitor C and a resistor R. The output of the former integrator circuit 9b is connected to the non-inverting input terminal of the adder 9a via a feedback circuit including a feedback coefficient circuit 9d. The output of the latter integrator 9c is connected to the inverting input terminal of the adder 9a. A bode diagram of the actuator model to be established by the actuator model indicative signal generator circuit 9 can be a gain curve by taking $\omega n = \sqrt{b}$ as a specific angular frequency, illustrated as shown in FIG. 4(b). By appropriately selecting the coefficients (the gain of the amplifiers) a and b in the coefficient circuits 9d and 9e, the gain curve becomes that corresponds to the transfer function of secondary component of the actuator 7. Thus, by adjusting the coefficient in the coefficient circuit 9d and 9e, the electric signal corresponding to the mechanical control magnitude $X_a$ of the actuator 7 can be derived from the output of the second transfer element 3.

Figure 5:
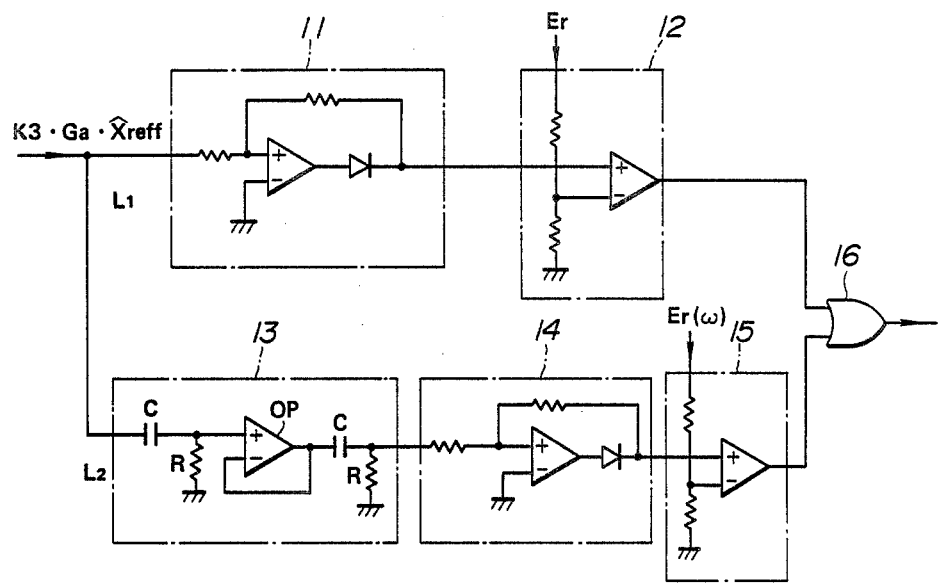
FIG. 5 is a block diagram showing a practical example of a defective disk detecting circuit to be employed in the tracking servo circuit of FIG. 1.

FIG. 5 shows an example of the discriminator circuit 10. The discriminator circuit 10 has a signal transfer line $L_l$ including a rectification circuit 11 and a first comparator 12. The rectification circuit 11 is full-wave rectification circuit 11 for outputting a full-wave rectified signal representative of an absolute value of an input from the modeling circuit 9. On the other hand, the non-inverting input terminal of the first comparator 12 is connected to the rectification circuit 11. On the other hand, the inverting input of the first comparator 12 is a reference voltage Er. Therefore, a HIGH level comparator signal is output from the first comparator 12 when the input from the rectification circuit 11 is greater than the reference voltage Er. The comparator signal of the first comparator 12 is fed to an OR gate 16. The gate signal of the OR gate 16 turns into HIGH level in response to the HIGH level comparator signal. This HIGH level gate signal serves as faulty disk indicative signal indicating that the optical disk loaded is no good, i.e. bad.

Figure 7B:
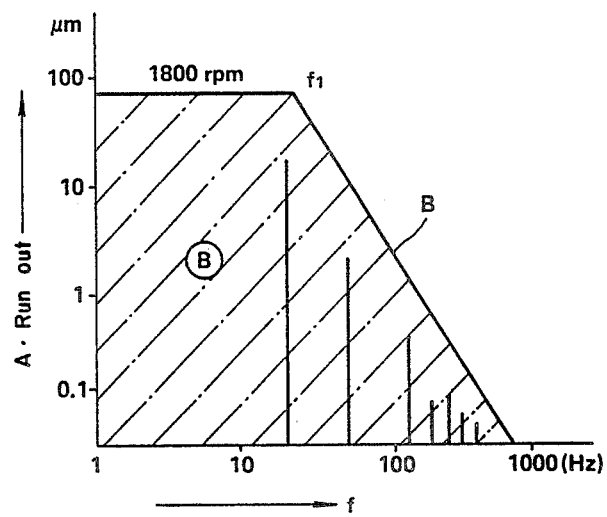

The discriminator circuit 10 also has another signal transfer line $L_2$, in which are disposed a differentiation circuit 13 which comprises a secondary differential amplifier including a resistor R, a capacitor C and an operational amplifier OP, a rectification circuit 14 and a second comparator 15. This signal transfer line $L_2$ is designed for discriminating whether an acceleration component of the actuator model indicative signal produced by the actuator model indicative signal generating circuit 9 is within a standarized axial run out. The limitation for the radial run out relative to the acceleration component is standarized by a slanted line B of $-12$ dB/OCT in the out of high frequency range. When the rotational speed of the optical disk is high, the frequency at which the the aforementioned slanted line B and horizontal line which represents absolute value, intersect, has to be lowered by shifting the standard run out magnitude, as shown in FIG. 7(b). For this purpose, the line B will be shifted toward the left in FIG. 7(b).

For this purpose, the actuator model indicative signal input from the actuator model indicative signal generating circuit 9 is differentiated twice to be enhanced by the high frequency component in the differentiation circuit 13. The output of the differentiation circuit 13 is fed to the non-inverting input terminal of the second comparator 15 via the rectification circuit 14. The inverting input terminal of the comparator 15 is exerted a reference voltage $Er(\omega)$ which is variable depending upon the rotation speed of the optical disk. This reference voltage $Er(\omega)$ which is variable depending upon the disk rotation speed defines the axial run out standard value, i.e. line B of FIG. 7(b). The second comparator 15 compares the input from the differentiation circuit 13 via the rectification circuit 14 with the reference voltage $Er(\omega)$ to output a HIGH level comparator signal when the former is greater than the latter. The OR gate 16 is also responsive to the HIGH level comparator signal to output the HIGH level gate signal indicative of the defective disk.

The optical disk recording and reproducing apparatus may be responsive to the defective disk indicative HIGH level gate signal to indicate that "the loaded disk is defective" or to eject the disk so that error in recording and reproducing information on such defective disk will never occur.

It should be appreciated that the reference voltages Er and $Er(\omega)$ to be applied to the first and second comparators may be set at a value corresponding to the maximum run out magnitude to which the servo system can successfully and satisfactorily respond. Furthermore, the transfer characteristics of the actuator can be illustrated by a secondary delay transfer function. Therefore, when the cut-off characteristics of the actuator match the cut-off characteristics of high frequency side run out standard, the second signal transfer line can be neglected.

Figure 6:
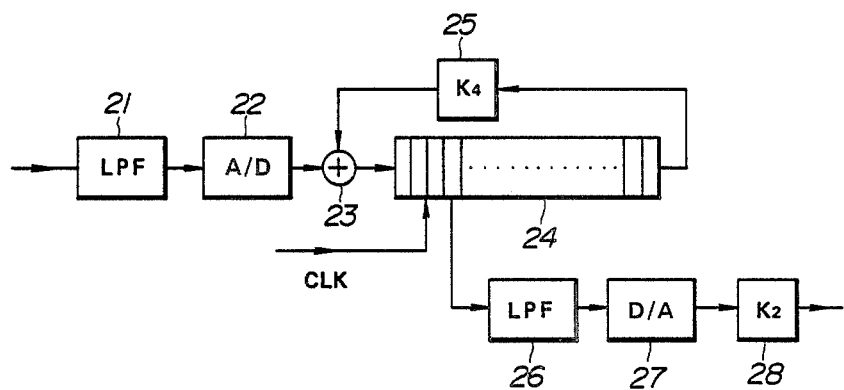
FIG. 6 is a circuit diagram of another embodiment of a signal transferring element to be employed in the preferred embodiment of the tracking servo circuit of FIG. 1.

FIG. 6 shows another practical embodiment of the second transfer element 3 in the preferred embodiment of the tracking servo system. In this embodiment, the second transfer element 3 is constituted by a digital circuit including a low-pass filter 21, an analog-to-digital (A/D) converter 22, an adder 23 and a shift register 24 which can be driven to shift the data by a clock signal CLK. The last stage of the shift register 24 is connected to the adder 23 via a coefficient circuit 25 of an amplifier having a gain corresponding to a preset coefficient $K_4$. In the shown embodiment, the gain of the coefficient $K_4$ set in the coefficient circuit 25 is negative. Therefore, the coefficient circuit 25 serves as attenuator. To the shift register 24, are connected a low-pass filter 26, a digital-to-analog (D/A) 27 and a coefficient circuit 28 which comprises an amplifier with a gain $K_2$.

The aforementioned circuit will serve as a comb filter. If the clock signal is synchronous to the period of disk rotation and the delay cycle period of the shift register coincides with the disk rotation period, the comb filter may provide a peak point at the eccentric component frequency range of the tracking error signal. This provides a high response ability to the eccentric component in the tracking error signal. Therefore, even with the transfer element of FIG. 6, substantially the same effect as that obtainable from the circuit of FIG. 2, in detection of the defective disk.

It should be appreciated that though the shown embodiment is concentrated in detection of defective disk in view of radial run out, the same or slightly modified process will be applicable for a focus servo system for detecting a defective disk in connection with axial run out.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An optical disk drive system for at least reproducing information recorded on an optical disk, comprising:
   an optical head designed for at least reproducing information on said optical disk and providing a basis for an error indicative signal;
   a servo loop for deriving a servo signal on the basis of said error indicative signal;
   a servo system associated with said optical head and servo loop for driving the optical head at a controlled magnitude in response to said servo signal;
   first means for extracting a run out frequency component in said servo loop to output a first signal indicative of said run out frequency component;
   second means for establishing a model representative of a control magnitude corresponding to a run out component on the basis of said first signal for producing a second signal indicative thereof; and
   third means for discriminating a run out magnitude of said optical disk with a predetermined run out magnitude by comparing a signal representative of said second signal with a reference signal and determining whether the run out magnitude is within or out of a predetermined range for detecting whether a disk is defective.

2. An optical disk drive system as set forth in claim 1, wherein said servo system is a tracking servo system and said error indicative signal represents a tracking error, and said first means extracts a radial component frequency.

3. An optical disk drive system as set forth in claim 2, wherein said third means compares an absolute value of said second signal with a reference value which represents a standard run out for detecting a defective disk having a run out magnitude out of a predetermined standard range represented by said reference value.

4. An optical disk drive system as set forth in claim 2, wherein said third means differentiates said second signal to derive a variation magnitude indicative signal and compares said variation magnitude indicative signal with a reference signal which represents a standard run out for detecting a defective disk having a run out magnitude out of a predetermined standard range represented by said reference signal.

5. An optical disk drive system as set forth in claim 2, wherein said third means comprises means for comparing an absolute value of said second signal with a first reference value which represents a first standard run out for detecting a defective disk having a run out magnitude out of a first predetermined standard range represented by said first reference value to produce a first comparator signal when said run out magnitude out of said first standard range is detected, means for differentiating said second signal to derive a variation magnitude indicative signal, means for comparing said variation magnitude indicative signal with a second reference value which represents a second standard run out for detecting a defective disk having a run out magnitude out of a second predetermined standard range represented by said second reference value to produce a second comparator signal when said run out magnitude out of said second standard range is detected, and means responsive to at least one of said first and second comparator signals to produce a defective disk indicative signal.

6. An optical disk drive system as set forth in claim 1, wherein said first means extracts an axial component frequency.

7. An optical disk drive system as set forth in claim 6, wherein said third means compares an absolute value of said second signal with a reference value which represents a standard run out for detecting a defective disk having a run out magnitude out of a predetermined standard range represented by said reference value.

8. An optical disk drive system as set forth in claim 6, wherein said third means differentiates said second signal to derive a variation magnitude indicative signal and compares said variation magnitude indicative signal with a reference which represents a standard run out for detecting a defective disk having a run out magnitude out of a predetermined standard range represented by said reference.

9. An optical disk drive system as set forth in claim 6, wherein said third means comprises means for comparing an absolute value of said second signal with a first reference value which represents a first standard run out for detecting a defective disk having a run out magnitude out of a first predetermined standard range represented by said first reference value to produce a first comparator signal when said run out magnitude out of said first standard range is detected, means for differentiating said second signal to derive a variation magnitude indicative signal, means for comparing said variation magnitude indicative signal with a second reference value which represents a second standard run out for detecting a defective disk having a run out magnitude out of a second predetermined standard range represented by said second reference value to produce a second comparator signal when said run out magnitude out of said second standard range is detected, and means responsive to at least one of said first and second comparator signals to produce a defective disk indicative signal.

10. An optical disk drive system as set forth in claim 1, wherein said first means comprises a filter circuit including a plurality of bandpass filter having a passband substantially corresponding to said run out frequency.

11. An optical disk drive apparatus as set forth in claim 1, wherein said first means comprises a comb filter circuit having a peak point set at a frequency corresponding to said run out frequency.

12. A defective disk detecting apparatus for use with an optical disk recording and reproducing apparatus, comprising:
   a tracking servo circuit means for receiving a target value indicative signal representative of a target value toward which an optical head of an optical disk recording and reproducing apparatus is to be controlled, and a control magnitude indicative signal from a control actuator to produce an error signal based on said target value indicative signal and said control magnitude indicative signal for controlling said optical head;
   a first means for extracting a run out frequency component in said tracking servo circuit means to output a first signal indicative of said run out frequency component;

a defective disk detecting circuit means for discriminating a good disk from a defective disk by detecting a run out magnitude, said defective disk detecting circuit means including a second means for establishing a model representative of a control magnitude corresponding to a run out component on the basis of said first signal indicative of said run out frequency component for producing a second signal indicative thereof and a third means for comparing a signal representative of said second signal with a reference value and determining whether a run out magnitude is within or out of a predetermined range for detecting whether a disc is defective.

* * * * *